Figure 1:
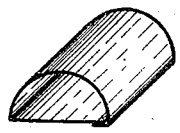
Figure 2:
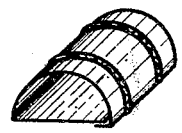

July 29, 1924.

H. PRYM 1,503,208

PACKING OR FILLING BODY FOR FILTERS

Filed Sept. 7, 1922

Inventor:
H. Prym
per R. Dittmar
Attorney.

Patented July 29, 1924.

1,503,208

UNITED STATES PATENT OFFICE.

HEINRICH PRYM, OF STOLBERG, RHEINLAND, GERMANY.

PACKING OR FILLING BODY FOR FILTERS.

Application filed September 7, 1922. Serial No. 586,670.

*To all whom it may concern:*

Be it known that I, HEINRICH PRYM, manufacturer, a citizen of the German Republic, and residing at Stolberg, Rheinland, Germany, have invented certain new and useful Improvements in Packing or Filling Bodies for Filters, of which the following is a specification.

This invention has reference to packing or filling bodies employed for the packing of filters, reaction chambers, heat exchange apparatus and the like, and it particularly refers to means whereby packing or filling bodies may be obtained which allow of being irregularly deposited, and in such a manner as to obviate the loss of active reacting surface which it was very difficult and almost impossible to avoid with the majority of irregularly deposited packing or filling bodies as heretofore constructed. For the filling or packing of filters it has been known to use small cylindrical hollow bodies provided with a diametrically arranged transverse partition. By means of this partition the currents of liquid, gas or air passing through the packing of the filter are compelled to effect a constant change of direction of flow and regardless of the manner of arrangement of the individual filling bodies which are either regularly mounted or irregularly deposited. When the filling bodies are thrown or dumped into the space the transverse partitions of the adjacent bodies will become more or less staggeringly arranged relatively to each other, so that the half currents produced by the transverse partition in the several filling bodies will be compelled to change their direction of flow. This point is of importance particularly in view of the fact that even in the otherwise undisturbed operation of a filter some slight concussions are always likely to occur which, if repeated, will finally operate to adjust and turn the filling bodies in a certain direction, so that they will be caused to arrange themselves more or less parallelly relatively to each other, even if the filling bodies as originally constructed or arranged would show no inclination of becoming parallelly disposed. The constant change of direction, however, is known to assist the activity of the contact surfaces upon which the filtering and other actions depend. The same considerations apply to the packing of absorption towers, reaction chambers, reaction towers, columns for the distillation of spirits and the like.

With a view of increasing the efficiency of the packing the substantially cylindrical filling body as previously constructed is modified according to my invention by so arranging the transverse partition, as to longitudinally divide the same, so as to obtain two substantially semi-cylindrical hollow bodies. If these hollow bodies are made of sheet metal their manufacture is greatly facilitated, and the resistance of the several hollow bodies against pressure is increased to such an extent that the sheet metal may be made thinner than heretofore, which results in a decrease of weight and a great economy in material not withstanding the repetition of the partition required by the dividing of the originally cylindrical bodies. This dividing up of the cylindrical body, moreover, produces the important effect that the currents are sure to be compelled to constantly change their direction of flow. Though the semi-cylindrical hollow bodies in view of their flat bases are inclined to assume positions parallel to each other, yet any two adjacent hollow bodies in becoming superposed with their flat surfaces, are more or less displaced relatively to each other, while, on the other hand, even those bodies which should happen to have their flat surfaces coincide entirely, will yet produce the same desirable action as the undivided hollow cylindrical bodies with transverse partition. Furthermore, wherever the flat surface of a semi-cylindrical body makes contact with the curved surface of an adjacent body, entirely different passages and channels are formed for the currents, so as to insure complete change of direction in this case likewise.

Figure 8:
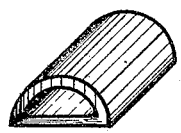

A packing or filling body embodying the principles referred to is shown by way of example on the accompanying drawing in several modifications. The filling bodies according to Figures 1 to 7 are made for instance from sheet metal material, while the filling bodies according to Figure 8 are constructed for instance from ceramic material. The respective shapes of the several filling bodies are apparent from the drawing.

Figure 3:
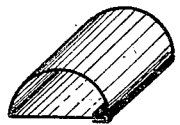
Figure 4:
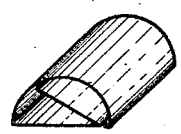
Figure 5:
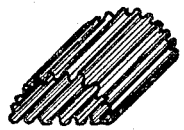
Figure 6:
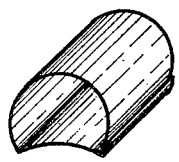
Figure 7:
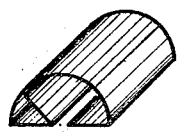

In the body according to Figure 1 the sheet metal is bent to a body of semi-circular cross section with the ends overlapping each other. According to Figure 2 it is assumed that a metal sheet is used having reinforcing ribs produced therein by rolling or pressing or in any other suitable manner. In Figure 3 the seam or joint is improved by folding. In Figure 4 the sheet is bent inwards into the interior of the semi-cylindrical cavity, so as to constitute a transverse partition. In Figure 5 it is assumed that corrugated sheet metal is used for the body. In Figure 6 the flat base is replaced by a curved surface, so as to obtain a kind of lune or an only approximated half cylindrical shape. In Figure 7 the half-cylindrical hollow body shows two transverse walls divergently projecting from the middle portion of the flat surface which are produced by the bending of the two ends of the strip of sheet metal. Figure 8 shows a semi-cylindrical filling or packing body of clay or other ceramic material which, of course, may also assume similar shapes to those hereinbefore referred to with reference to the sheet metal body.

In all the sheet metal bodies the joint or seam may be welded or closed by soldering. The approximate semi-circular shape in case of one flat surface, may also be obtained by making the curved surface not exactly, but only approximately semi-circular. In this case the flat surface may also be replaced by an only slightly curved surface. However, a true semi-circular shape is to be preferred.

Various other modifications and alterations of the packing or filling body according to my invention may be made, and different kinds of material, either metallic or non-metallic, metal, glass or other suitable material may be used without deviating from the spirit of my invention, as pointed out in the claims.

I claim:—

1. As an improved article of manufacture, a packing body for filters, of semi-cylindrical contour, open at opposite ends and having reinforcing portions at one edge of the flat side.

2. As an improved article of manufacture, a packing body for filters, of semi-cylindrical contour, open at opposite ends and having reinforcing portions at one edge of the flat side and having a transverse partition extending from said edge.

3. As an improved article of manufacture, a packing body for filters, of semi-cylindrical contour, open at opposite ends and having reinforcing portions at one edge of the flat side and having an integral partition extending within said body.

In testimony whereof I affix my signature in presence of two witnesses.

HEINRICH PRYM.

Witnesses:
ROBERT BEEDE,
RÄTHE MEYER.